United States Patent [19]
Choi et al.

[11] Patent Number: 6,128,157
[45] Date of Patent: Oct. 3, 2000

[54] STRUCTURE FOR PRESSING A CASSETTE IN A MAGNETIC RECORD AND PLAYBACK MACHINE

[75] Inventors: Sung Hun Choi, Kyungki-do; Myung Cheol Baek, Seoul; You Seok Chae, Kyungki-do; Sung Pyo Hong, Kyungki-do; Jong Dae Park, Kyungki-do; Soo Beom Lee, Kyungki-do; Joon Bong Bang, Kyungki-do; Eui Jung Yeon, Kyungki-do, all of Rep. of Korea

[73] Assignee: LG Electronics, Inc, Seoul, Rep. of Korea

[21] Appl. No.: 09/083,088

[22] Filed: May 22, 1998

[30] Foreign Application Priority Data

May 23, 1997 [KR] Rep. of Korea ...................... 97-20257

[51] Int. Cl.[7] ................................................. G11B 15/675
[52] U.S. Cl. ............................................................ 360/96.5
[58] Field of Search .............................................. 360/96.5

[56] References Cited

U.S. PATENT DOCUMENTS

| | | | |
|---|---|---|---|
| 4,628,382 | 12/1986 | Okumura | 360/93 |
| 4,635,147 | 1/1987 | Durand et al. | 360/93 |
| 4,912,579 | 3/1990 | Kinoshita et al. | 360/96.5 |
| 5,062,015 | 10/1991 | Maeng et al. | 360/96.5 |
| 5,493,459 | 2/1996 | Shiomi | 360/94 |
| 5,557,485 | 9/1996 | Stephens et al. | 360/96.5 |
| 5,659,442 | 8/1997 | Ojima | 360/96.5 |
| 5,706,146 | 1/1998 | Ono et al. | 360/96.5 X |

*Primary Examiner*—David L. Ometz
*Assistant Examiner*—Angel Castro

[57] ABSTRACT

A structure for pressing a cassette in a magnetic record and playback machine which includes a cassette holder having guide posts containing fixing slots on both lateral sides of the cassette holder, a driving arm having concave slots in which the guide posts are inserted, and an elastic supporting member surrounding the upper side and both lateral sides of the cassette holder. The upper part of the elastic supporting member has one or more folds which extend downward and both ends of the elastic supporting member are placed in the fixing slots of the guide posts, and both ends of the elastic supporting member are inserted into the concave slots of the driving arm along with the guide posts.

10 Claims, 3 Drawing Sheets

STRUCTURE FOR PRESSING A CASSETTE IN A MAGNETIC RECORD AND PLAYBACK MACHINE

BACKGROUND OF THE INVENTION

The present invention relates to a structure for pressing a cassette in a magnetic record and playback machine, and more particularly to a structure for pressing a cassette in a magnetic record and playback machine, wherein both ends of an elastic supporting member surrounding an upper side and both lateral sides of a cassette holder are pressed by a driving arm, and which enables the cassette holder and the cassette to be maintained in a stable state.

Generally, in a magnetic record and playback machine having a front loading system, when a cassette is inserted into a cassette insertion aperture mounted at the front of a deck, a driving motor is engaged which removes the cassette holder in which the cassette is fixed to a loading position. The driving force is then transferred to a driving arm mounted on both of the lateral sides of the cassette holder after passing through a power transmission system containing a plurality of gear trains. Therefore, as the driving arm rotates, the cassette holder is moved to the loading position.

FIG. 1 is a partially exploded perspective view of a conventional structure for pressing a cassette; FIG. 2 is a longitudinal, sectional view of the conventional pressing state for a cassette; and FIG. 3 is a perspective view showing the conventional pressing state of a cassette.

As shown in the figures, the conventional structure for pressing a cassette comprises a cassette 1 which is inserted into a cassette holder 2 and can be reciprocated between a loading position and an ejecting position. A driving arm 3 is operatively connected to the cassette holder 2.

The cassette holder 2 comprises plate springs 2a which press against the upper side of the cassette 1. The plate springs are mounted on both sides of the upper side of the cassette holder, and guide posts 2b extend from both of the lateral sides thereof.

The driving arm 3 includes a pair of arms 3b having slots 3a, and a central rod 3c which links the arms 3b together. The guide posts 2b can be inserted into the slots 3a, and thus the cassette holder 2 can be moved by the driving arm 3 which rotates around the guide posts disposed within the slots 3a.

As shown in FIGS. 2 and 3, in the conventional structure for pressing a cassette, the driving arm 3 rotates clockwise corresponding to the ejecting state. Hence, as the arrows show in FIG. 2, as the guide posts 2b of the cassette holder 2 are inserted into the concave slots 3a, a pressing force is applied in the downward direction by the driving arm 3.

Thus, the whole cassette holder 2 moves downward along with the cassette 1, and this movement stops when the bottom of the cassette 1 contacts the upper end of the cassette supporting member 4 formed on the base plate. However, the cassette holder 2 moves downward until the upper side of the cassette 1 contacts the upper side of the cassette holder 2 by a force applied by the driving arm 3.

As previously mentioned, in the state in which the upper side of the cassette 1 contacts with the upper side of the cassette holder 2, because the driving arm 3 maintains a downward force on the cassette holder 2, the cassette 1 is always maintained in a pressed state. In addition, while it is not shown in the figures, generally a spring is mounted on the driving arm 3 and one end of the spring is elastically connected with the guide post 2b of the cassette holder 2.

Accordingly, when the cassette 1 is in a loading position, a force which presses downwardly due to the spring us applied to the cassette holder 2.

However, in the conventional structure for pressing a cassette in a magnetic record and playback machine, both of the lateral sides of the upper side of the cassette holder 2 press the lateral sides of the upper side of the cassette 1, and a force from the driving arm 3 is always applied to the guide post 2b. Therefore, as the dotted line shows in FIG. 2, both lateral sides of the upper side of the cassette holder 2 is modified by widening outward, and according to this, the cassette 1 is fixed in the cassette holder 2 is shoved upward and the state of pressing the cassette 1 becomes unstable.

That is, in the conventional structure for pressing a cassette, when the cassette 1 has been standing in a loading state for a long time, the cassette holder 2 is somewhat modified and the inserting and ejecting of the cassette 1 cannot be accomplished smoothly or performed at all.

SUMMARY OF THE INVENTION

Accordingly, it is an object of the present invention to provide a structure for pressing a cassette in a magnetic record and playback machine in which both ends of an elastic supporting member surrounding the upper side and both lateral sides of a cassette holder are pressed by a driving arm which prevents the cassette holder from being modified.

In order to realize this objective, the structure for pressing a cassette as defined by the present invention comprises a cassette holder which moves along with the cassette when it is inserted into the inside of the machine, a driving arm which transfers power from the driving source and drives the cassette holder, and an elastic supporting member surrounding the upper side and both lateral sides of the cassette holder, wherein both ends of the elastic supporting member are inserted into the concave slots of the driving arm.

The elastic supporting member contains one or more folds extending downwardly at a location disposed above the upper side of the cassette holder, and the ends of the folds are adapted to elastically contact the upper side of the cassette.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The structure for pressing a cassette in a magnetic record and playback machine as defined by the present invention will be explained in detail by referring to the accompanying drawings.

Figure 1:
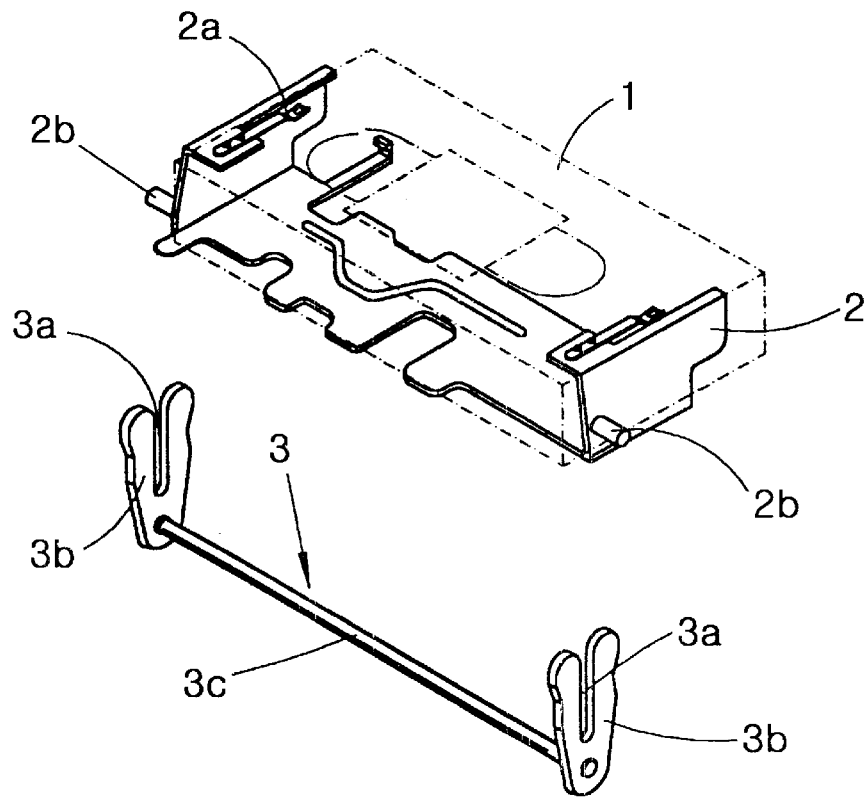
FIG. 1 is a partially exploded perspective view of a conventional structure for pressing a cassette.
Figure 2:
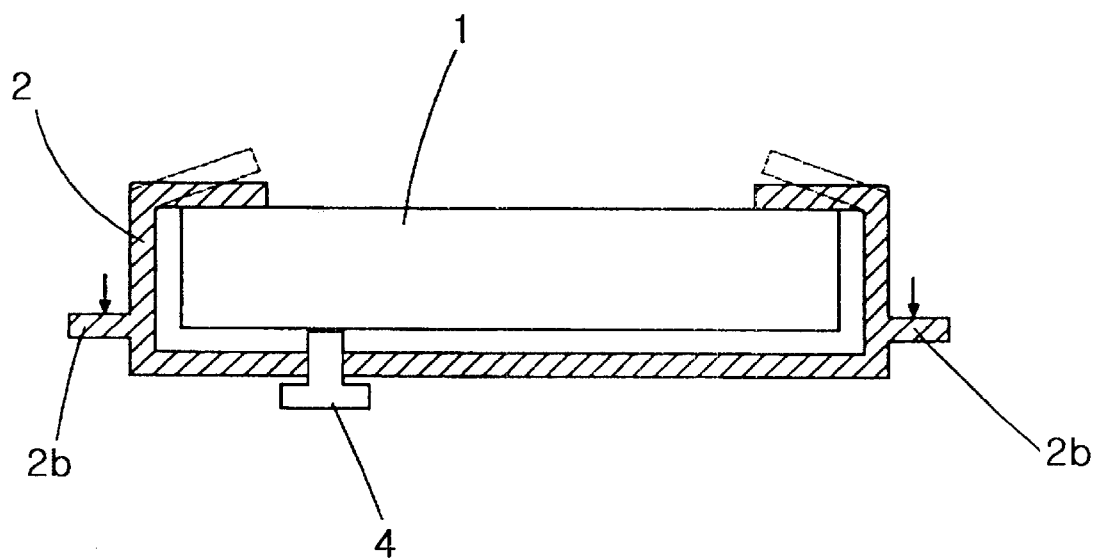
FIG. 2 is a longitudinal, sectional view of a conventional pressing state of a cassette.
Figure 3:
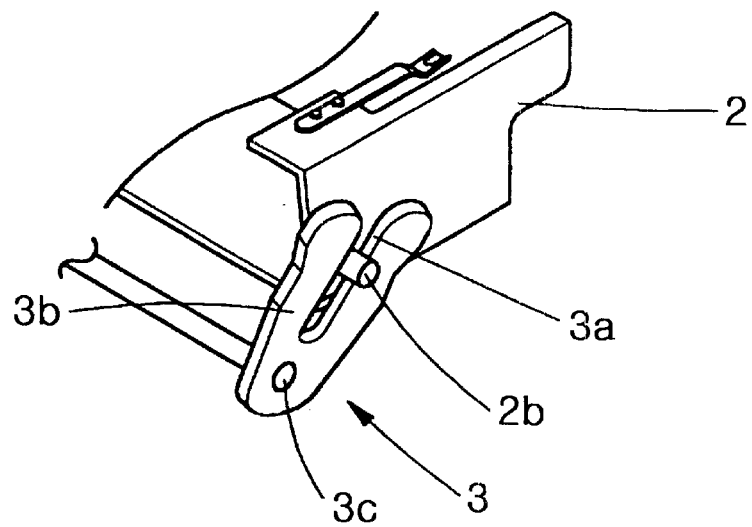
FIG. 3 is a perspective view showing a side portion of a conventional pressing state of a cassette.
Figure 4:
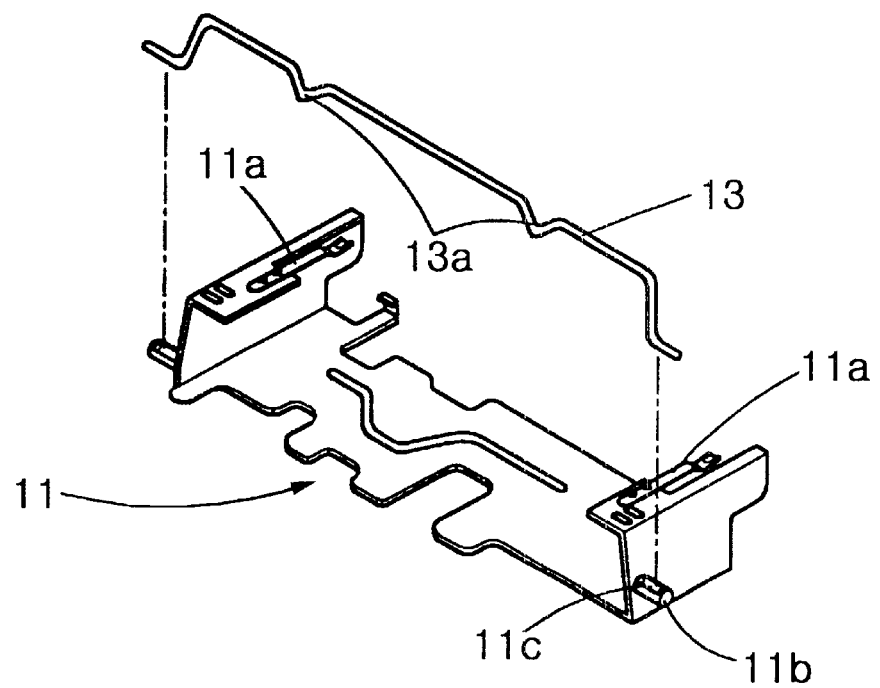
FIG. 4 is a partially exploded perspective view of the structure of the present invention for pressing a cassette.
Figure 5:
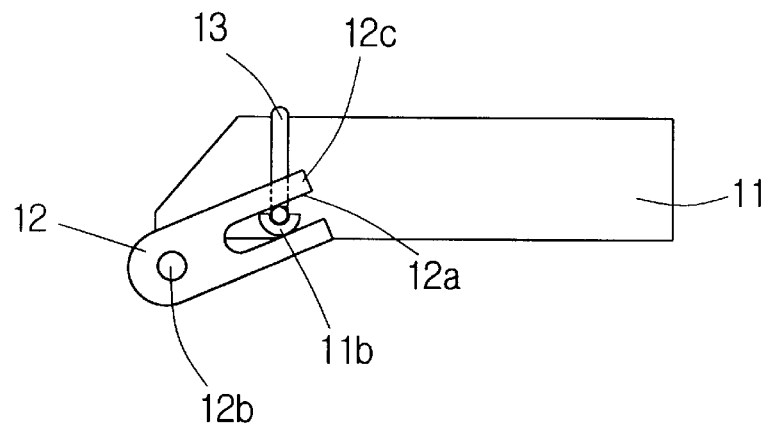
FIG. 5 is a side view of the pressing state for a cassette as defined by the present invention.
Figure 6:
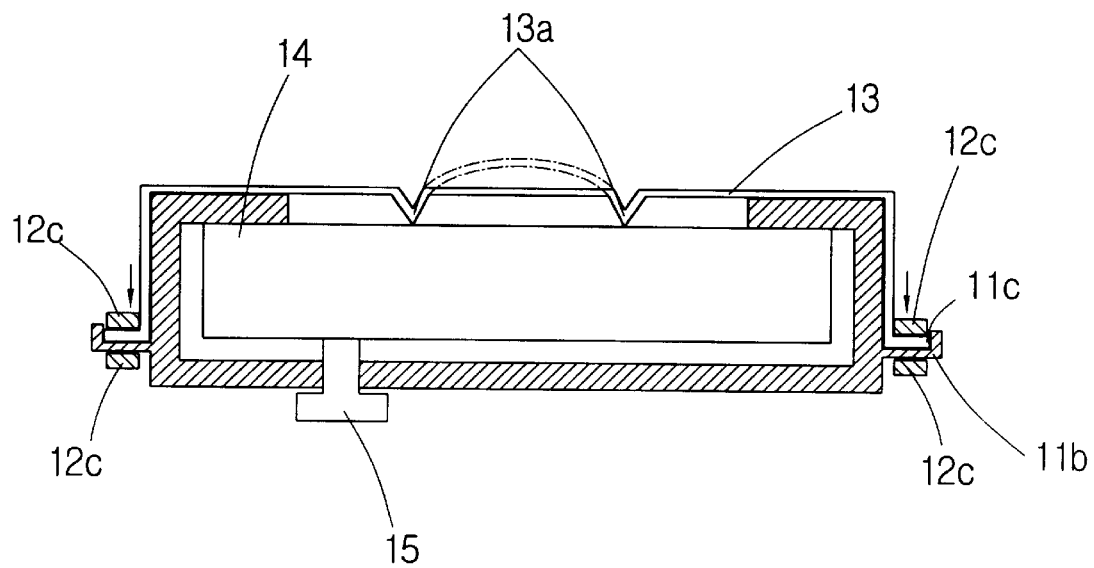
FIG. 6 is a longitudinal, sectional view of the pressing state for a cassette as defined by the present invention.

FIG. 4 is a partially exploded perspective view of the structure of the present invention for pressing a cassette. FIG. 5 is a sectional view of the pressing state of a cassette, and FIG. 6 is a longitudinal, sectional view of the pressing state of the cassette.

As shown in the figures, the present structure for pressing a cassette comprises a cassette holder 11 having plate springs 11a on both lateral sides of the upper side thereof and guide posts 11b projecting from both lateral sides thereof. A driving arm 12 having concave slots 12a is provided for receiving the guide posts 11b between a pair of guide arms 12c and driving the cassette holder 11 by rotating with a rotary central axis 12b, as a center. An elastic supporting member 13 which is formed to surround both of the lateral sides and the upper or top side of the cassette holder 11, has two ends which are inserted into the respective concave slots 12a along with the guide post 11b.

A semicircular fixing slot 11c is formed at an inside portion of the guide post 11b and the ends of the elastic supporting member 13 is fixed in the fixing slots 11c.

The elastic supporting member 13 is formed to have a C-shaped configuration by folding the elastic bar as one unit into a main body having two arms. The free ends of each arm is bent in opposite directions, away from each other. The main body contains two folds 13a which extend away from the main body. Reference numbers 14 and 15 represent a cassette and a cassette supporting member, respectively.

The operation of the pressing structure for a cassette of the present invention is as follows. First, as shown in FIG. 5, when the cassette holder 11 moves to a loading position by the driving arm 12 rotating clockwise, the upper guide arm 12c of the driving arm 12 presses downward against the ends of the elastic supporting member 13 disposed in the concave slot 12a. In accordance with this step, the elastic supporting member 13 also stretches downward with the upper side and both of its lateral sides of the elastic supporting member 13 pressing on the upper side and both of the lateral sides of the cassette holder 11. In this state, the cassette holder 11 itself is pressed downward. Therefore, the elastic supporting member 13, the cassette holder 11, and the cassette 14 are pressed and moved downward, together. When the bottom side of the cassette 13 contacts with the cassette supporting member 15, the cassette 14 does not move downward anymore. However, the cassette holder 11 and the elastic supporting member 13 keep the movement in the downward direction.

Thus, the downward movement of the cassette holder 11 and the elastic supporting member 13 is maintained, and the folds 13a of the elastic supporting member 13 elastically contact the upper side of the cassette 14. Although the cassette 14 is forced upward by the repulsive force of the cassette supporting member 15, any upward movement is prevented by contact between the upper side of the cassette holder 11 and the upper side of the cassette 14. However, because the cassette holder 11 is continuously pressed downward by the guide arm 12c of the driving arm 12, the cassette 14 maintains a stable pressed state.

In the state described above, the section between the folds 13a of the elastic supporting member 13, shown as a dotted line in FIG. 6, can be modified to expand upward.

As previously mentioned, according to the present invention, pressing a cassette utilizing the elastic supporting member 13 presses the upper side and both of the lateral sides of the cassette holder 11, with the elastic supporting member 13 functioning as a supporting bar. This prevents both the lateral sides and the upper side of the cassette holder 11 from widening in the outward direction.

Therefore, in the structure for pressing a cassette in a magnetic record and playback machine of the present invention, the elastic supporting member prevents the cassette holder from being modified which improves the reliability of the device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure for pressing a cassette in a record and playback machine, comprising:

a cassette holder having lateral sides with guide posts extending outwardly from said lateral sides, at least one of said guide posts including a groove formed therein;

at least a first arm of a driving member, said first arm including a slot which engages one of said guide posts; and an elastic supporting member extending across a top portion of said cassette holder and connected to said cassette holder, said elastic support member for holding a cassette to said cassette holder, and an end of said elastic supporting member being disposed in said groove.

2. The structure of claim 1, further comprising:

a second arm of said driving member, said second arm including a slot which engages another of said guide posts; and a connecting member connected to said first and second arms.

3. The structure of claim 1, wherein said slot of said first arm engages said guide post having said groove and maintains said end of said elastic supporting member in said groove.

4. The structure of claim 1, wherein said slot of said first arm engages an end of said elastic supporting member.

5. The structure of claim 1, wherein said elastic supporting member includes at least one projecting portion projecting down from said top portion of said cassette holder.

6. The structure of claim 5, wherein said projecting portion is a fold in said elastic supporting member.

7. The structure of claim 1, wherein said elastic supporting member has a U-shape with two side members and a cross member connected between said two side members, said cross member disposed across said top portion of said cassette holder, and each of said side members extending along a respective one of said lateral sides.

8. The structure of claim 1, wherein said cassette holder includes a bottom side connected to said lateral sides, and first and second top side portions, each projecting from a respective one of said lateral sides and facing said bottom side such that a gap exists between said first and second top side portions.

9. The structure of claim 8, wherein each of said first and second top side portions has a plate spring connected thereto.

10. The structure of claim 1, further comprising:

at least one plate spring; and wherein said cassette holder includes at least one top side portion connected to one of said lateral sides, said plate spring connected to said top side portion.

\* \* \* \* \*